US012809843B2

(12) United States Patent
Koona

(10) Patent No.: US 12,809,843 B2
(45) Date of Patent: Nov. 24, 2026

(54) CLOUD-BASED TABULAR DATA CELL COMMENT FRAMEWORK

(71) Applicant: SAP SE, Walldorf (DE)

(72) Inventor: Siddiq Ahmed Koona, Bengaluru (IN)

(73) Assignee: SAP SE, Walldorf (DE)

( * ) Notice: Subject to any disclaimer, the term of this patent is extended or adjusted under 35 U.S.C. 154(b) by 102 days.

(21) Appl. No.: 18/921,531

(22) Filed: Oct. 21, 2024

(65) Prior Publication Data

US 2026/0111406 A1 Apr. 23, 2026

(51) Int. Cl.
*G06F 16/22* (2019.01)

(52) U.S. Cl.
CPC ...... *G06F 16/2246* (2019.01); *G06F 16/2255* (2019.01)

(58) Field of Classification Search
None
See application file for complete search history.

(56) References Cited

U.S. PATENT DOCUMENTS

| | | | | |
|---|---|---|---|---|
| 2014/0067626 | A1* | 3/2014 | Chikovani | G06Q 10/10 705/28 |
| 2017/0272250 | A1* | 9/2017 | Kaliski, Jr. | H04L 9/3239 |
| 2018/0123995 | A1* | 5/2018 | Xue | G06F 16/248 |
| 2019/0205453 | A1* | 7/2019 | Miller | G06F 16/245 |
| 2022/0335538 | A1* | 10/2022 | Park | G06Q 10/40 |
| 2023/0008999 | A1* | 1/2023 | Beers | G06F 16/2246 |
| 2024/0168979 | A1* | 5/2024 | Anand | G06F 16/287 |
| 2025/0258806 | A1* | 8/2025 | Pat | G06F 16/2246 |
| 2025/0392439 | A1* | 12/2025 | Kaliski, Jr. | H04L 9/006 |

* cited by examiner

*Primary Examiner* — Aleksandr Kerzhner
*Assistant Examiner* — Anugeetha Kunjithapatham
(74) *Attorney, Agent, or Firm* — Buckley, Maschoff & Talwalkar LLC

(57) ABSTRACT

According to some embodiments, systems and methods are provided including a memory storing program code; and one or more processing units to execute the program code. Execution of the program code causes the system to receive a plurality of leaf nodes; and generate one hierarchical path for each leaf node. Execution of the program code also causes the system to generate one or more groups for the plurality of leaf nodes based on the determined hierarchical path; and generate a hash value for each group. Each hash value is stored in a database. Numerous other aspects are provided.

13 Claims, 14 Drawing Sheets

502

Beverages
- Soft Drinks
  - Cola
  - Seltzer
- Alcohol
  - Dark Beer
  - Vodka

504

Leaf Nodes = Cola, Seltzer, Dark Beer, Vodka

506

Paths
Beverages/Soft Drink/Cola
Beverages/Soft Drink/Seltzer
Beverages/Alcohol/Dark Beer
Beverages/Alcohol/Vodka

508

Groups:
- Beverages: {Cola, Seltzer, Dark Beer, Vodka}
- Soft Drinks: {Cola, Seltzer}
- Alcohol: {Dark Beer, Vodka}

510

Hash Value:
- Beverages → Hash Value 1
- Soft Drinks → Hash Value 2
- Alcohol → Hash Value 3
- Cola → Hash Value 4
- Seltzer → Hash Value 5
- Dark Beer → Hash Value 6
- Vodka → Hash Value 7

FIG. 5

CLOUD-BASED TABULAR DATA CELL COMMENT FRAMEWORK

BACKGROUND

Organizations collect and store large sets of data. The organizations then use applications to help understand that data, via analysis, predictions, planning and reporting. The applications may include features like reports, dashboards, data exploration, data preparation and visualizations such as charts, tables and other visual formats to display data in a way that can be quickly and easily understood. These features play a central role in discovering unseen patterns in the data, which may help the organization. To that end, it may be helpful for users to collaborate across these features via comments. Comments help in collaboration because users may find certain insights in the data and they then may add their insights as comments to the features to be viewed by other users.

Users may create a data model to analyze the data, and then may create different visualizations from the data model, the visualizations representing different aspects. For example, for a sales data model, one visualization represents sales by geographic region, while another visualization represents sales by product type. The data model often contains a selection of measures and attributes. Attributes (e.g., product name, category, country, year, supplier, etc.) are descriptive elements that provide context for a measure. A measure is a numeric value, such as a price or quantity, on which arithmetic or statistics operations (e.g., quantity, sales revenue) can be processed. A dimension is a group of related attributes. Non-exhaustive examples of dimensions are product, cost center, employee, etc. For the non-exhaustive product dimension example, various related attributes of product name, category and supplier may be included. Dimensions are re-usable objects that can be used to develop data models. The model may contain multiple dimensions.

Comments on the different visualizations created for the data model are conventionally stored against the context in which they are generated. Contexts are used to show the place of values in a structure, with values (e.g., members/elements) having the same parent node being in the same context. The context includes the dimensions and the dimension members that participated to make the context for the visualization. Often a comment made against a particular set of dimensions in a first visualization should be displayed/visible in other visualizations including hierarchies that contain the members of those particular sets of dimensions. A hierarchy is a structured representation of a dimension. The different levels in the hierarchy may be referred to as nodes or members, and a leaf node refers to the lowest level in the hierarchy that does not have any child nodes. The leaf node is not a dimension itself, but rather a member within a dimension that does not have any further subdivisions. As a non-exhaustive example, consider a hierarchical dimension like “Geography” with levels such as “Country,” “State” and “City”, a city like “New York” is a leaf node because it doesn’t have any further subdivisions within this hierarchy.

In response to a request to display the already stored comments on a new visualization, the conventional comment process: 1. retrieves all of the stored comments saved for the model, across all visualizations, 2. fetches the context for each stored comment, 3. determines whether the context for the stored comment matches a context in the new visualization by comparing individual members of the context in the new visualization to the context for the stored comment, 4. displays the stored comment in the new visualization in case there is a match. The generation of all of the possible combinations of leaves to form the contexts (members having a same parent node) in the new visualization, fetching all of the stored comments, and matching against all of the stored contexts for the stored comments is performance intensive and may lead to comment process instability.

Systems and methods are desired for improving the efficiency with which comments may be retrieved for use in other visualizations. Improving this efficiency may effectively increase the capacity of the application to respond to any requests.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 5 illustrates a non-exhaustive example of the path and groups for the visualization in FIG. 1 according to some embodiments.

Figure 1:
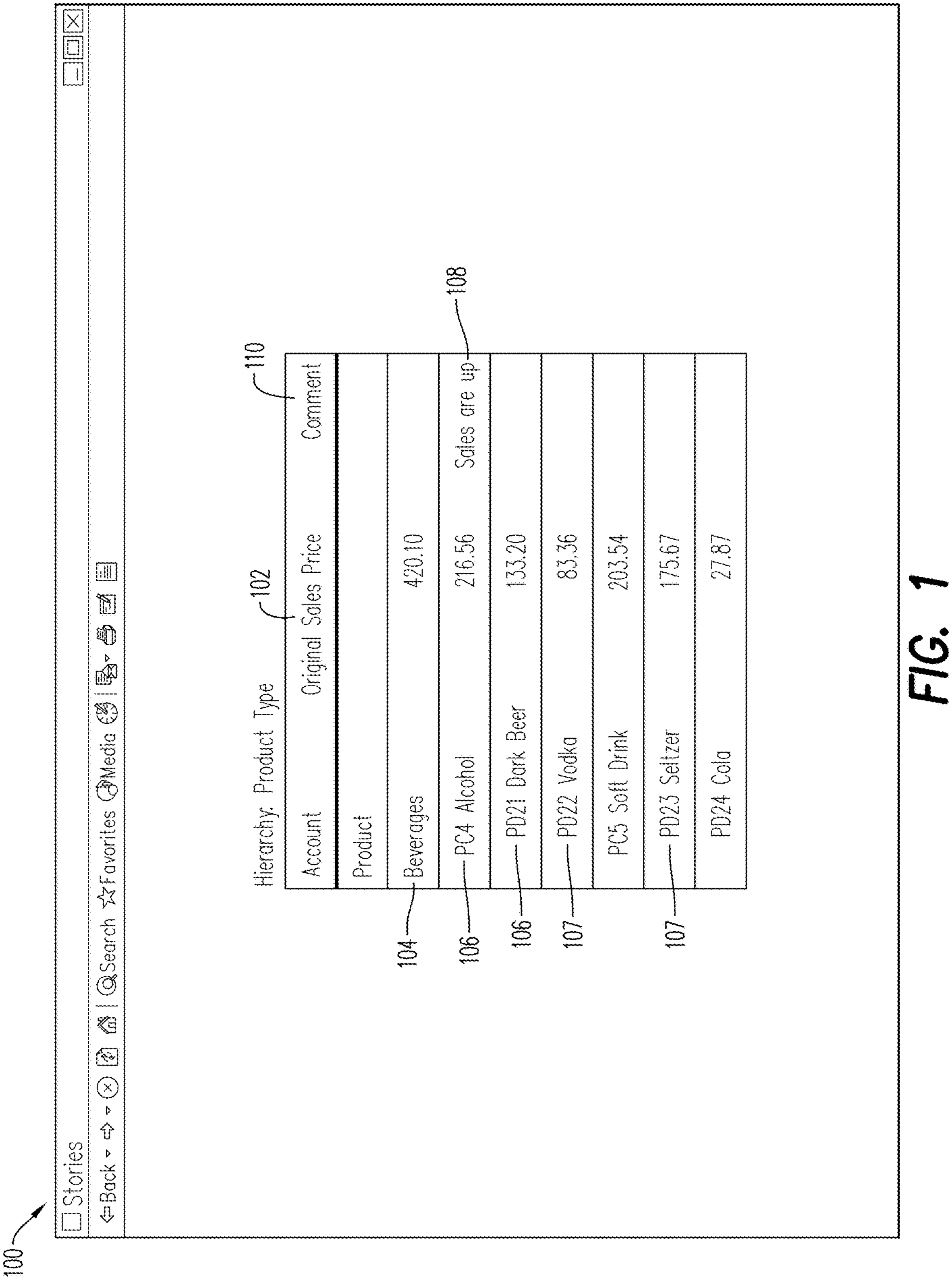
FIG. 1 is a user interface including a visualizations.

Throughout the drawings and detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein. It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above a user may use an application to create a data model that represents particular data of the organization, the data using common terminology. The model may have a structure that includes one or more dimensions, and in some cases one or more measures. Each dimension may have members and hierarchies, and attributes defined for the dimensions. In some cases, the model may include calculations. Data may be imported to the model and exported from the model. After the model is created, and data imported, the user may want to see a visual representation of the data or want to show it to someone else. The visualization may be referred to as a story. The visualization may be in the form of charts, tables, geo maps, etc. While a table is the non-exhaustive example used herein, embodiments include other visualizations.

Turning to FIG. 1, a non-exhaustive example of a user interface 100 including a table 102 for a first model is provided. Here, the table 102 includes a beverage dimension 104, with members 106, alcohol, dark beer, vodka, soft drink, seltzer and cola. Of those members, dark beer, vodka, seltzer and cola are leaf nodes 107, while alcohol and soft drink are parent nodes (or sub-parent nodes) and beverage is a parent node. It is noted that in some instances, in a case a parent node only has one child node, the parent and child's leaf nodes are the same. During review of the visualization, a user may add a comment 108 to the table in a cell of the comment column 110. Conventionally, the comment 108 is saved with the context for the visualization. Here, the comment is on the alcohol node and the context (the members having the same parent node) is the dark beer leaf node and the vodka leaf node, for the beverages dimension.

Figure 2:
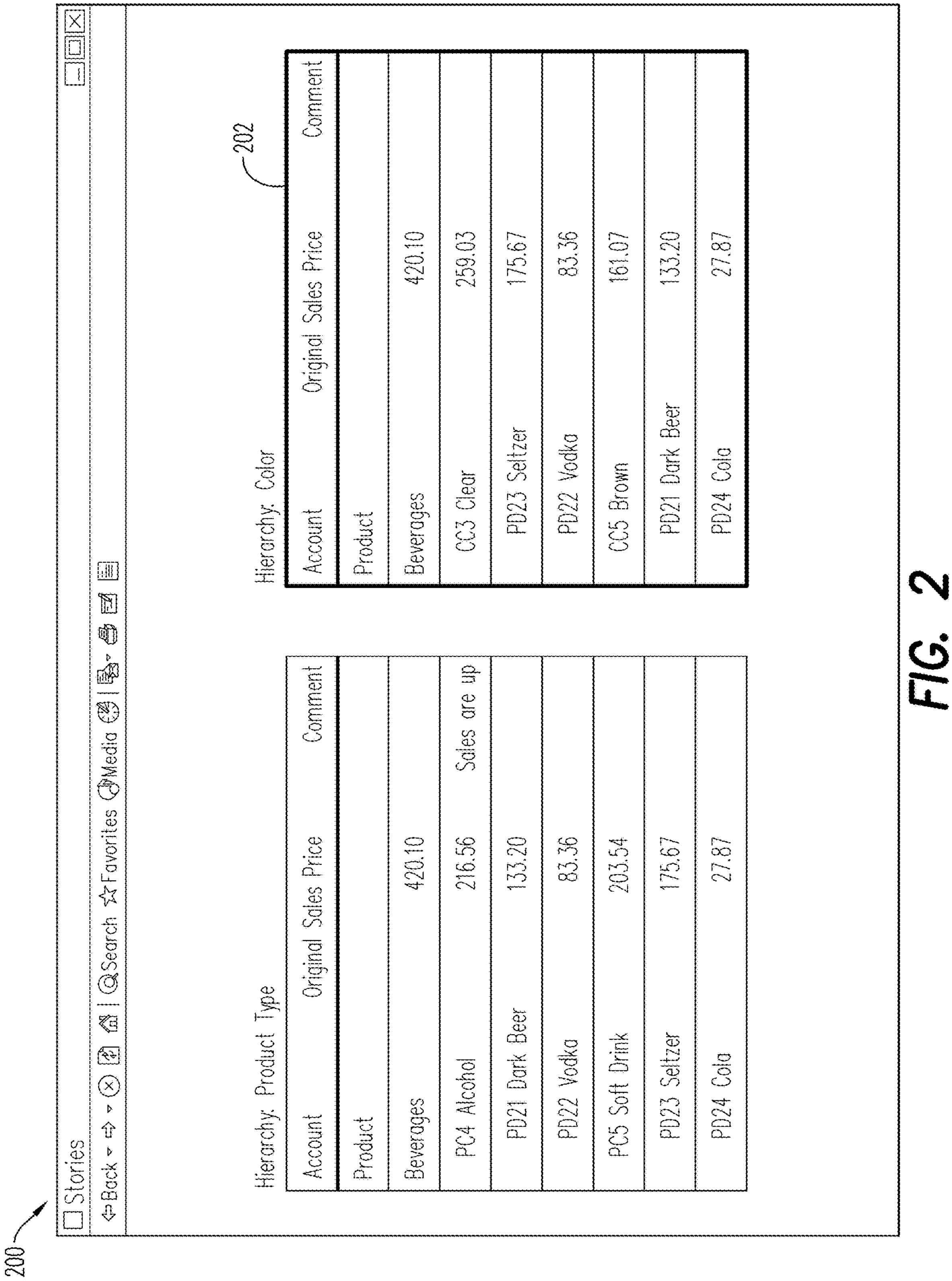
FIG. 2 is user interface including two visualizations.

FIG. 2 is a non-exhaustive example of a user interface 200 including the table 102 of FIG. 1 and a second table 202 for the first model. The second table 202 represents a different view of the data of the first model. In this non-exhaustive example, the first table 102 represents the data based on a product type hierarchy, while the second table 202 represents the data based on a color hierarchy. The visualization developer can select the second table 202, indicated by the darkened outline, and request, via the UI, the second table 202 show comments. Conventionally, the comment process to render the comments on the second table 202, includes first retrieving all of the stored comments saved for the model (e.g., the comment shown in FIG. 1, for the first table, and any other comment on any other visualization created for the first model.). Here, the comment is the comment 108 on the alcohol parent node. Second, the conventional comment process fetches the context for each stored comment. The context for the stored comment may be referred to as the "writer's context". Here, the writer's context is dark beer and vodka. Third, the conventional comment process determines whether the writer's context matches a reader's context. The reader's context is the context for the visualization that may receive the comment if there is a match. The conventional comment process determines a reader's context before it can determine whether there's a match. Here the three reader's contexts are 1. seltzer, vodka, 2. dark beer, cola, and 3. seltzer, vodka, dark beer, cola and all leaf nodes separately i.e., 4. seltzer, 5. vodka 6. dark beer 7. cola. The conventional comment process takes each comment stored in the database for this model and fetches its stored comment context (referred to as the writer's context) and tries to match it against each reader's context, one-by-one. For example, for the writer's context including dark beer and vodka, for a first comment, does the first reader's context (seltzer, vodka) have dark beer? If not, as is the case here, the process moves on to the second reader's context. For the second reader's context (dark beer, cola), is dark beer included? In this case, it does, so the process moves on to check the next node (vodka) in the second reader's context. If the next node in the second reader's context is vodka, then there is a match. If the next node in the second reader's context is not vodka, as is the case here, the process moves on to the third reader's context. For the third reader's context, while the dark beer and vodka are included, the third reader's context includes other nodes that are not included in the writer's context, resulting in the third reader's context not matching the writer's context. The process concludes there is no match in this example because the alcohol context including dark beer and vodka members does not match any of the reader's contexts, so the comment from the first table 102 is not displayed on the second table 202. It is noted that while one comment is shown herein, a model may have 100,000 comments, resulting in the conventional comment process having to match 100,000 contexts with these leaves. It is further noted that each node in the hierarchy may have one or more comments stored for it. This conventional comment process including the checking all of the combinations of leaf nodes to determine whether any comments exist on non-leaf nodes is time consuming and memory intensive.

To address these problems, a comment framework or system provides for the determination of which visualizations should have a stored comment rendered thereon without having to fetch all comments that exist for a particular model and validate each of the saved comment context against the readers context. Pursuant to embodiments, for each visualization, the comment framework builds a hierarchical path ("path") for each leaf node to the parent. The path represents a plurality of nodes in a parent-child hierarchy including at least one leaf node and at least one parent node or sub-parent node. As used herein, a sub-parent node is a node on a level lower than the parent, but above the leaf node (e.g., a node between the parent and the leaf node). By iterating through each path, the comment framework identifies the exact possible leaf combinations/groups which belong to any parent that are possible for the given leaves (this is for the readers context). When saving a comment, the comment context includes a hash value representing the children of that particular node where the comment is being made and this becomes part of the writer's context. It is also to be noted that on some occasions the node might not be part of the visualization, but it is part of filters used to restrict the data that is rendered on to the Visualization. These filter values are then used to generate the cached leaves which eventually become part of the writer's context. Then, when determining whether the comment should be rendered on a new visualization, the hash value stored in the comment for a previous visualization is compared to the hash values in the new visualization to determine a match. This ensures that not all leaf combinations that are part of the writer's context are to be validated, and instead only the exact leaf groups that exist for a given parent are generated and matched against the writer's context. It is to be noted that with the conventional approach, the reader's context was passed as a combination of all possible leaves for the visualization rendered, and writer's context's leaves (already saved) were looked up in the above list of "possible leaves" to find out if a match exists.

Figure 3:
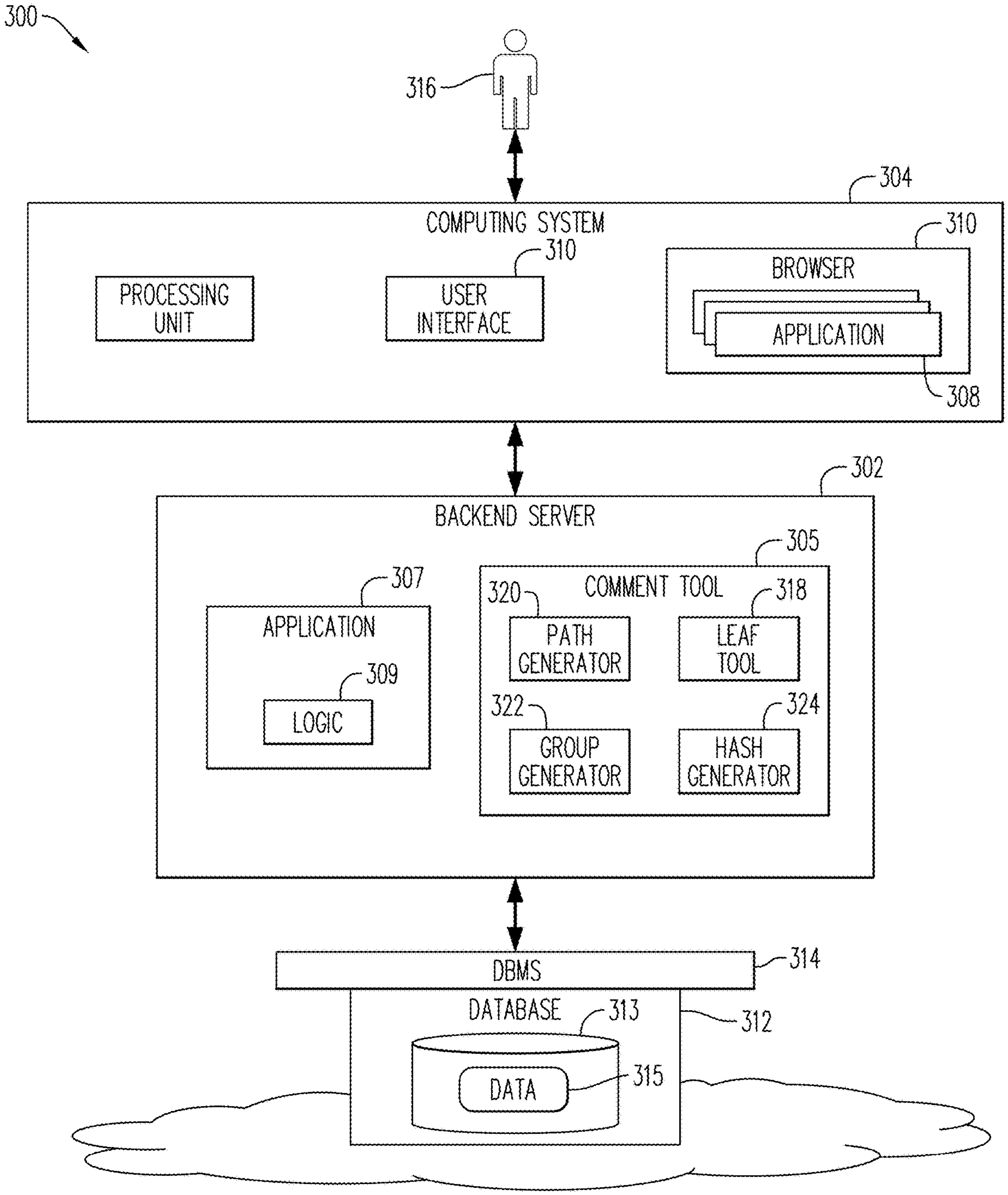
FIG. 3 is a block diagram of an architecture according to some embodiments.

FIG. 3 is a high-level block diagram of a comment framework or system architecture 300 according to some embodiments. The illustrated elements of system architecture 300 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of system architecture 300 are implemented by a single computing device, and/or two or more elements of system architecture 300 are co-located. One or more elements of system architecture 300 may be implemented using cloud-based resources, and/or other systems which apportion computing resources elastically according to demand, need, price, and/or any other metric. One or more components may be implemented as a cloud service (e.g., Software-as-a-Service, Platform-as-a-Service).

System architecture 300 includes backend server 302, a comment tool 305, a local computing system 304 including a browser 306 running a client application 308 and user interface 310. System architecture 300 also includes a database 312, a database management system (DBMS) 314 and a client/user 316. As ushed herein, the terms "client, "user" and "end-user" may be used interchangeably.

The backend server 302 may include server applications 307 and a comment tool 305. Server applications 307 may comprise server-side executable program code (e.g., compiled code, scripts, etc.) executing within the backend server 302 to receive queries/requests from clients/users 316, via the local computing system 304, and provide results to clients/users 316 based on data of the database 312 and application logic 309. Logic 309 of the application 307 may comprise program code to provide functionality to users 316. The functionality may comprise any functionality that is or becomes known, and providing such functionality may require access via DBMS 314 to data 315 stored in storage device 313 of database 312.

The comment tool 305 includes a leaf tool 318, a path generator 320, a group generator 322, and a hash generator 324.

The leaf tool 318 receives a visualization and identifies one or more leaf nodes. As described above, the leaf nodes represent the lowest members in the parent-child hierarchy that do not have any child nodes. The leaf tool 318 may access the level-based hierarchical structure and the parent-child hierarchical structure and analyze each node to identify the leaf nodes as those nodes that od not have any child nodes.

The path generator 320 may receive one or more leaf nodes included in a visualization. For received each leaf node, the path generator 320 may access a model structure for the model for which the visualization was created, and create a path for each leaf node. The path is a hierarchical path from that respective leaf node to the parent. The path generator 320 begins the path with the parent node. The path generator 320 then analyzes each level in the model structure, and adds each successive sub-parent node between the parent node and the leaf node to the path.

The group generator 322 receives the paths from the path generator 320. Then, based on the created paths, the group generator 322 identifies common parent nodes/sub-parent nodes in the paths and creates groups based on the commonality. In particular, the group generator generates a first group, for example, of two or more leaf nodes, wherein a respective path of the two or more leaf nodes in the first group include all common parent nodes and sub-parent nodes. For example, a first group may be Beverages, including Cola, Seltzer, Dark Beer and Vodka, while a second group may be Soft Drinks, including Cola and Seltzer, as described further below with respect to FIG. 5.

The hash generator 324 receives the groups and generates a hash for each group. The hash is saved in the database 312. When a request is received to render the stored comments on a visualization, the groups are retrieved and the comment tool 305 uses the groups to determine whether any of the stored comments should be rendered on the visualization, as described further below.

The backend server 302 may provide any suitable interfaces through which clients/users 316 may communicate with the applications 307/308 executing thereon. The backend server 302 may include a Hyper Text Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface. Backend server 302 may be separated from or closely integrated with DBMS 314. A closely-integrated backend server 302 may enable execution of applications 307 completely on the database platform, without the need for an additional server. For example, backend server 302 may provide a comprehensive set of embedded services which provide end-to-end support for Web-based applications. Backend server 302 may provide application services (e.g., via functional libraries) which applications 307 may use to manage and query the database files stored in the database 312. The application services can be used to expose the database data model, with its tables, hierarchies, views and database procedures, to clients/users 316. In addition to exposing the data model, backend server 302 may host system services such as a search service, and the like.

Generally, local computing system 304 executes one or more of applications 308 to provide functionality to client/user 316. Applications 308 may comprise any software applications that are or become known, including but not limited to visualization applications including commenting functionality. As will be described below, applications 308 may comprise web applications which execute within a web browser 306 of local computing system 304 and interact with corresponding server applications 307 to provide desired functionality. The client application 308 may send a user interface request (or other suitable request) to a server-side or back-end application ("server application") 307 for execution thereof. For example, when a user clicks on a button or enters information via a UI of the client application 308, a request is sent to the backend server 302. The backend server then responds with what needs to be rendered/content that is then provided to the client application. The user 316 may interact with the resulting displayed user interface output from the execution of applications, to create further visualizations, reports, analyses, etc.

Presentation of a user interface as described herein may comprise any degree or type of rendering, depending on the type of user interface code generated by the backend server 302/local computing system 304.

In one example, user 316 may operate a user device (not shown) to execute a Web browser or another client application which provides access to user interfaces of application 308 via the computing system 304 and through a network (also not shown). User 316 submits a request to application 308 via such a user interface. The request may comprise a request to render comments based on data 315. In response, backend server 302 executes logic 309 to determine one or more queries of database 312 which are required to respond to the request. The queries are transmitted to database 312 via DBMS 314 and corresponding result sets are received from database 312. Logic 309 uses the result sets to formulate a response to the original request and returns the response to the computing system 304. The computing system 304 displays the response for the user 316.

Database 312 may comprise any query-responsive system for data storage and retrieval that is or becomes known. Database 312 may be cloud-based, and/or distributed. Storage device 313 may comprise one or more solid state and/or platter-based fixed disks, non-volatile random-access memories, etc. Data 315 may include database tables conforming to one or more database schemas, in row-based, column-based or other formats.

DBMS 314 serves requests to store, retrieve and/or modify data of database 312, and also performs administrative and management functions. Such functions may include snapshot and backup management, indexing, optimization, garbage collection, and/or any other database functions that are or become known. DBMS 314 may also provide application logic, such as database procedures and/or calculations, according to some embodiments. This application logic may comprise scripts, functional libraries and/or compiled program code. DBMS 314 may comprise any query-responsive database system that is or becomes known, including but not limited to a structured-query language (i.e., SQL) relational database management system.

System 300 may comprise any number of unshown hardware and software components, including, but not limited to, gateways, routers, redundant components, etc.

Figure 4:
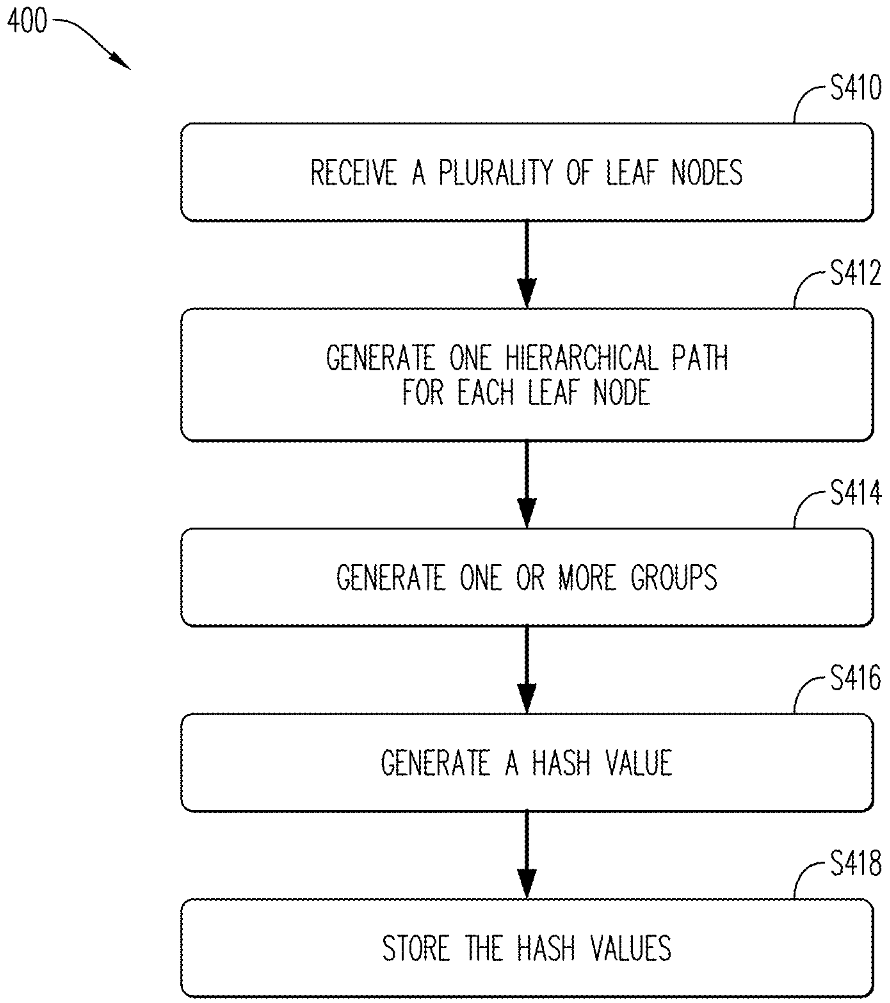
FIG. 4 is a flow diagram of a process according to some embodiments.

FIG. 4 illustrates a process 400 to generate a hierarchical path for each leaf node of a plurality of leaf nodes according to some embodiments. The process 400, and other processes described herein (e.g., 700, 1000), may be performed by a database node, a cloud platform, a server, a computing system (user device), a combination of devices/nodes, or the like, according to some embodiments. In one or more embodiments, the system architecture 300 may be conditioned to perform the process 400, and other processes described herein (e.g., 700, 1000), such that a processing unit 1435 (FIG. 14) of the system architecture 300 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to the start of the process, a user has logged-in to a visualization application and created the table visualization "table" 102 for data of a data model, as shown in FIG. 1. The data model has a structure including a level-based hierarchical structure organizing multiple dimensions into levels and shows the number of members and parent-child hierarchies in each dimension, and shows any attributes that have been defined for the dimensions, and is saved as data 315. A user interface element (e.g., save button (not shown)) is selected to initiate the process 400.

Initially, at S410, a plurality of leaf nodes 504 (FIG. 5) are identified. As described above, the leaf nodes represent the lowest members in the parent-child hierarchy that do not have any child nodes. The leaf tool 318 may access the level-based hierarchical structure and parent-child hierarchical structure and analyze each node to identify the leaf nodes as those nodes that do not have any child nodes. Continuing with the non-exhaustive table 102 of FIG. 1, the leaf tool 318 analyzes the combined level-based and parent-child hierarchical structure 502 (FIG. 5) and identifies the leaf nodes 504 as: cola, seltzer, dark beer, and vodka.

Based on the identified leaf nodes 504 and the combined level-based and parent-child hierarchical structure 502, the path generator 320 then generates a path 506 for each leaf node at S412. As described above, the path generator 320 begins the path for a given leaf node with the parent node that leaf node, by identifying the parent node for each leaf node in the data model structure. The path generator 320 then analyzes each level between the parent node and the leaf node in the data model associated with a respective leaf node to identify any sub-parent nodes in the data model structure for the given leaf node. Next, the path generator 320 adds any identified sub-parent nodes to the identified parent node and the identified leaf node to generate the path, wherein the nodes in the path are listed in hierarchical order from parent node to leaf node. Continuing with the non-exhaustive example, and as shown in FIG. 5, consider the leaf node Cola. The path generator 320 begins the path 506 for Cola with the parent Beverages. The sub-parent Soft Drink is the next node in the model structure between Beverages and Cola, and is added to the path. The path generator 320 then determines no other nodes exist between Soft Drink and Cola, and completes creation of the path 506. The path 506 for Cola is Beverages/Soft Drink/Cola. Essentially, the leaf node can appear in each of the parents or sub-parents (e.g., Cola is a descendant of Beverages and Cola is a descendant of Soft Drink). The path generator 320 repeats the process for the other leaf nodes and returns the following: the path 506 for Seltzer is Beverages/Soft Drink/Seltzer, the path 506 for Dark Beer is Beverages/Alcohol/Dark Beer, and the path 506 for Vodka is Beverages, Alcohol, Vodka. For all of these leaf nodes, no other combinations are valid.

Next, at S414, one or more groups are generated via the grouping generator 322. The grouping generator 322 generates groups 508 from the paths based on a common parent. Pursuant to embodiments, generating the one or more groups includes first identifying for the generated paths, leaf nodes having common parents and sub-parents in the hierarchy, and second generating a group of two or more leaf nodes wherein a respective path of the two or more leaf nodes in the group include all common parents and sub-parents. Continuing with the non-exhaustive example, and as shown in FIG. 5, there are three groups 508—Group 1: Beverages, including Cola, Seltzer, Dark Beer, Vodka; Group 2: Soft Drinks, including Cola and Seltzer; and Group 3: Alcohol including Dark Beer and Vodka.

Then, in S416, a hash value 510 is generated. The hash value 510 is generated by a hashing function that receives the group as input and returns a hash value 510. Hash values are also generated for individual leaf nodes, where the individual leaf node is the input to the hashing function. Continuing with the non-exhaustive example, the hashing function returns a Hash Value 1 for the Beverages group, Hash Value 2 for the Soft Drinks group, Hash Value 3 for the Alcohol group, Hash Value 4 for Cola, Hash Value 5 for Seltzer, Hash Value 6 for Dark Beer and Hash Value 7 for Vodka. It is noted that the leaf nodes are created in a particular order in the database, such that the leaf nodes in the group are always in a same order. For example, the Beverages group is sorted such that the leaf nodes are ordered as Cola, Seltzer, Dark Beer, Vodka, and the hash value is created for the leaf nodes in this order. In a case the leaf nodes were ordered differently (e.g., Seltzer, Dark Beer, Cola, Vodka), a different hash value would be generated. Pursuant to embodiments, and due to the ordering, only one hash value exists for common members (e.g., Cola, Seltzer, Dark Beer and Vodka can only be ordered in this way).

The hash value 510 is then stored in the database 312 at S418.

Figure 6:
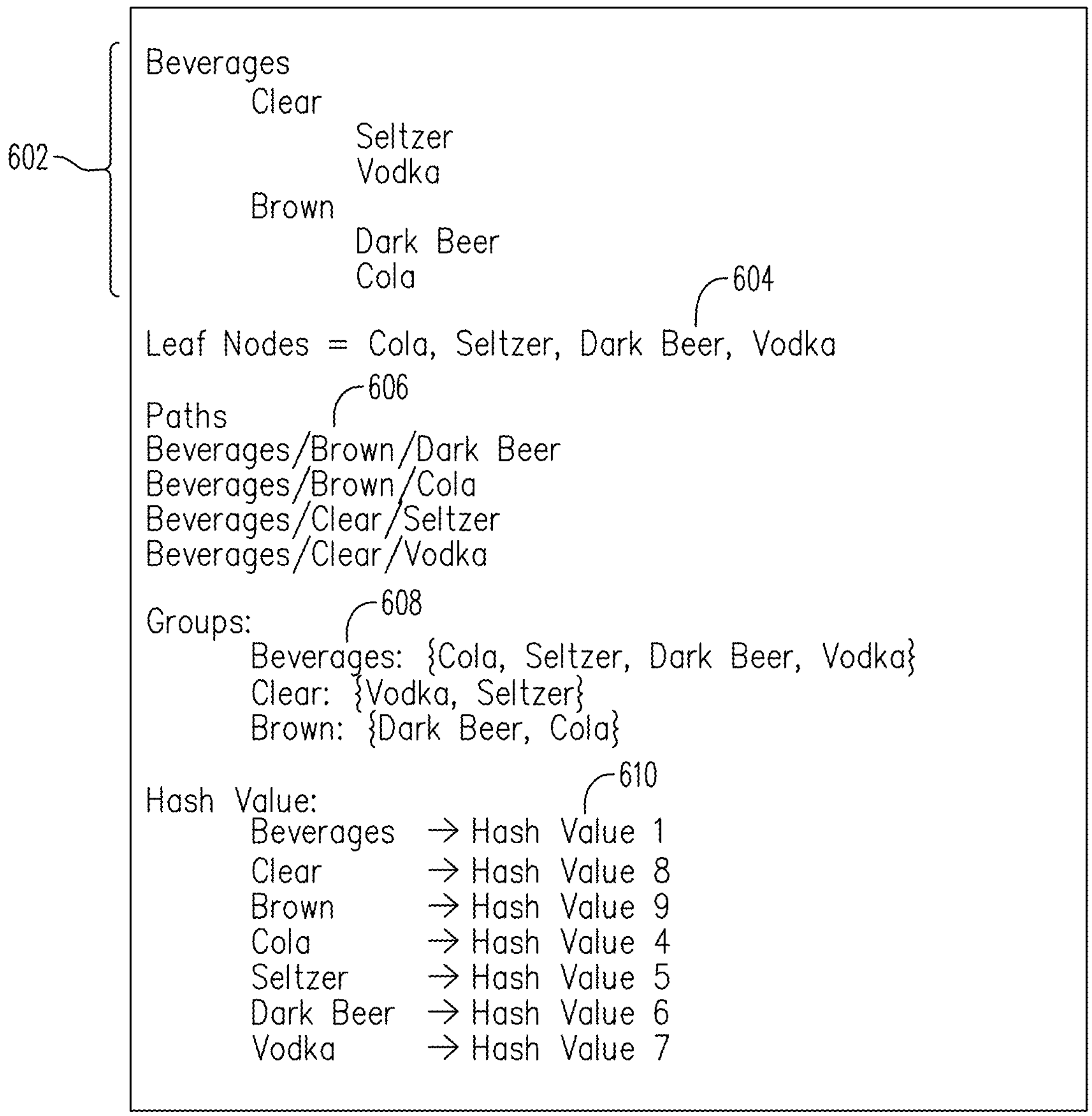
FIG. 6 illustrates a non-exhaustive example of the path and groups for one of the visualization in FIG. 2 according to some embodiments.

As another non-exhaustive example, consider the second table 202 in FIG. 2. In FIG. 2, the first table 102 was created, the process 400 was executed, and the hash values were stored. The user created the second table 202 based on the same data model as used in the creation of the first table 102 (FIG. 1), using a different level-based hierarchical structure. Here, the level-based hierarchical structure for the first table 102 is a product type hierarchy and the level-based hierarchical structure for the second table 202 is a color hierarchy. Application of the process 400 to the second table 202, identifies the leaf nodes 604 (FIG. 6) based on the combined level-based and parent-child hierarchical structure 602 (FIG. 6). As shown in FIG. 6, the leaf nodes 604 for the second table 202 are: Cola, Seltzer, Dark Beer and Vodka. Based on the identified leaf nodes 604 and the combined level-based and parent-child hierarchical structure 602, the path generator 320 then generates a path 606 for each leaf node at S412. The path 606 for Dark Beer is Beverages/Brown/Dark Beer; the path 606 for Cola is Beverages/Brown/Cola; the path 606 for Seltzer is Beverages/Clear/Seltzer; and the path 606 for Vodka is Beverages/Clear/Vodka. Next, at S414, one or more groups are generated via the grouping generator 322. Here, there are three groups 608 for the second table 202—Group 1: Beverages, including Cola, Seltzer, Dark Beer, Vodka; Group 2: Clear, including Vodka and Seltzer; and Group 3: Brown, including Dark Beer and Cola. Then, in S416, a hash value 610 is generated. Here, the hashing generator 324 returns Hash Value 1 for the Beverages group, Hash Value 8 for the Clear group, Hash Value 9 for the Brown group, Hash Value 4, for Cola, Hash Value 5 for Seltzer, Hash Value 6 for Dark Beer and Hash Value 7 for Vodka. It is noted that the same hash value is returned for the Beverages group for the first table 102 and the second table 202 because the members (Cola, Seltzer, Dark Beer, Vodka) in the group are the same and in the same order when received as input by the hashing generator 324. Similarly, the same hash values are returned for the leaf nodes as there is no change for them. The hash value 610 is then stored in the database 312 at S418. These hash values are stored to match against the writer's context, as described further below.

Figure 7:
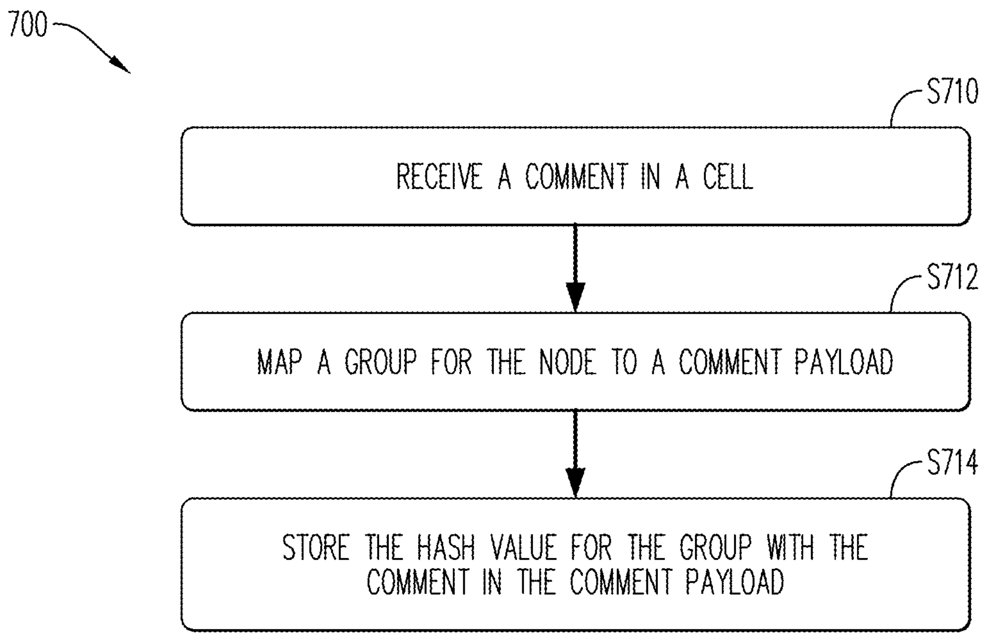
FIG. 7 is a flow diagram of a process according to some embodiments.

FIG. 7 illustrates a process 700 to receive a comment in a cell for a data point (e.g., node) according to some embodiments.

Figure 8:
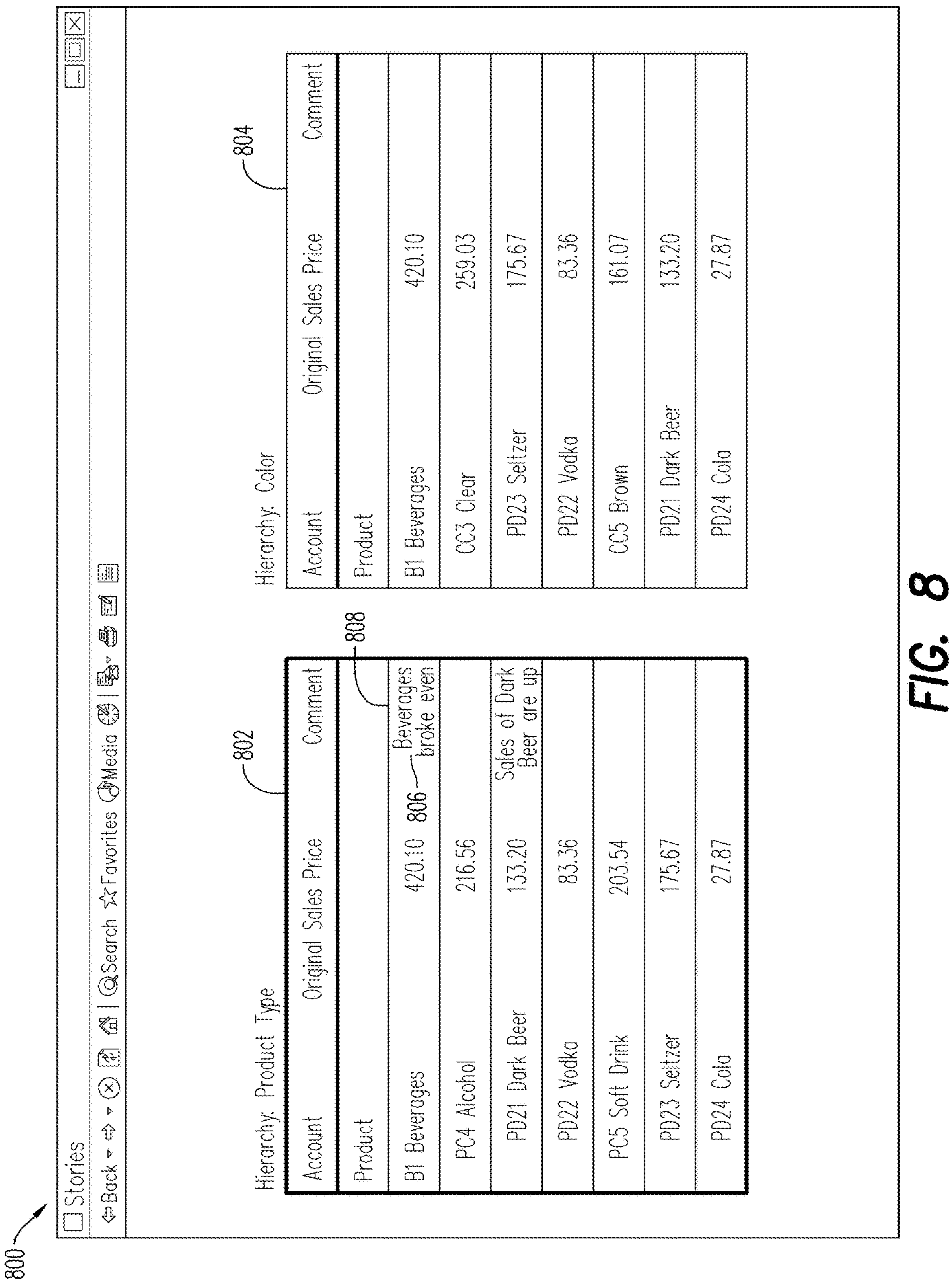
FIG. 8 is a user interface with comments according to some embodiments.

Prior to the process 700, the user has created and/or opened a table 802, 804, displayed in the User Interface display 800 in FIG. 8, via a visualization application.

Initially, at S710, a comment 806 is received (for a particular data point) in a corresponding cell 808 of a table. Pursuant to some embodiments, the comment 806 may be received directly in the cell 808 or may be entered in a pop-up window (not shown) and then populated in the cell 808. Continuing with the non-exhaustive example, two comments have been received in two individual cells. The first comment 806—Beverages broke even—is received in the cell 808 for the parent node Beverages, and the second comment 806—Sales of Dark Beer are up—is received in the cell 808 for the leaf node Dark Beer.

Figure 9:
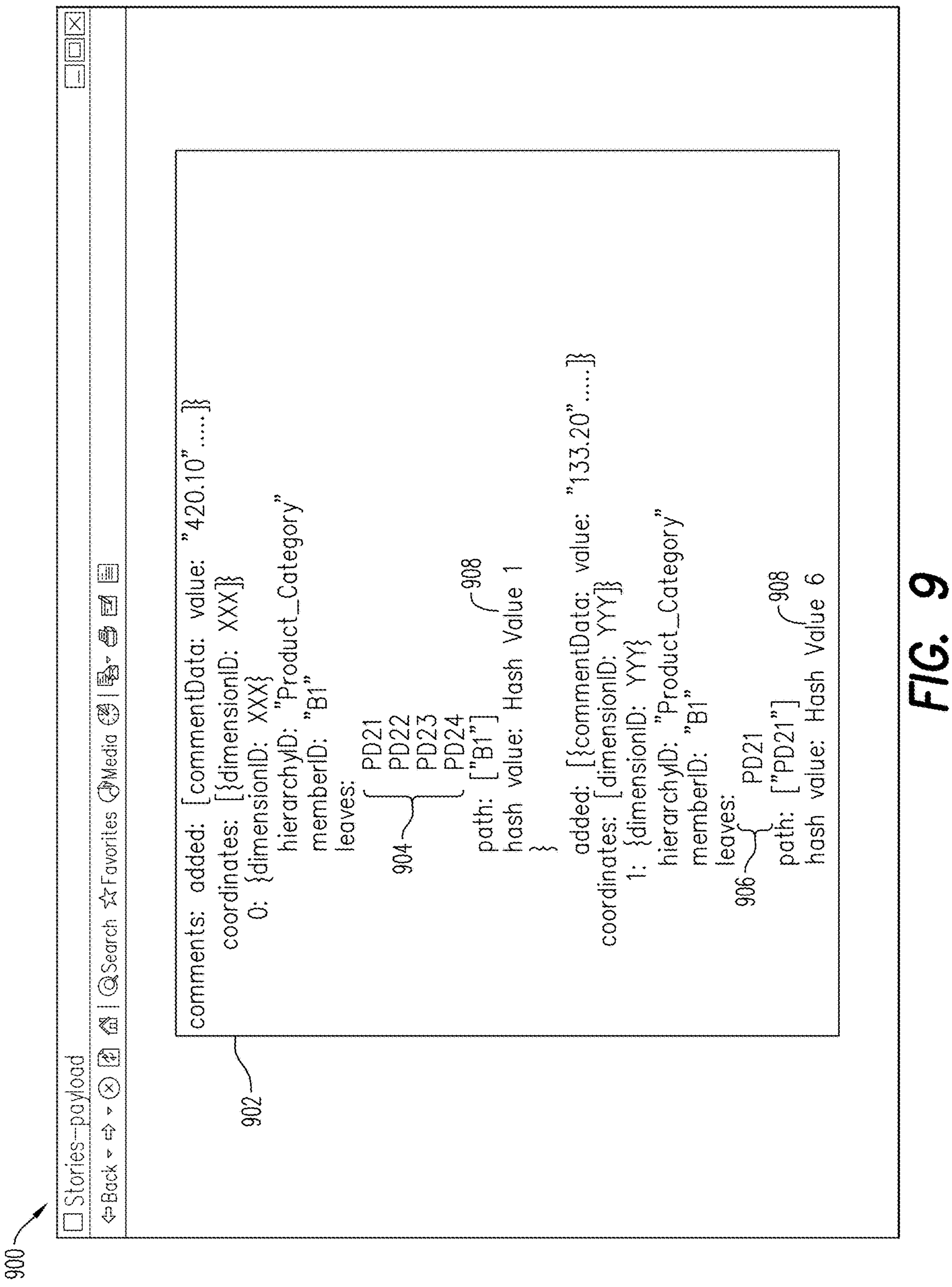
FIG. 9 is a user interface including a partial payload for FIG. 8 according to some embodiments.

Then in S712, a group for the node is mapped to a comment payload 902 at a location 908 for that respective comment, shown in the user interface 900 of FIG. 9. It is noted that there may only be one group available for mapping. The mapping is based on: 1. the comment tool 305 identifying the node corresponding to the cell in which the comment was received; 2. the comment tool 305 identifying the groups including that node (or that the node is a leaf node with no group); 3. retrieving the hash value for the identified group (or identified leaf node); and 4. adding the hash value to the comment payload. The hash value is then stored with the comment at S714, as indicated at 908 in the comment payload 902. Here, for the first comment—Beverages broke even—the Beverages node is the identified node, and since that node is not a leaf node, the hash value is for a group that includes the leaves with identifiers PD21, PD22, PD23, PD24. The leaves of the group are added to the comment payload 902, as indicated at 904. Here, for the second comment—Sales of Dark Beer are up—the Dark Beer node is the identified node, and since the node is a leaf node, the hash value is for the leaf itself with identifier PD21. The leaf identifier for Dark Beer is added to the comment payload 902, as indicated at 906. It is further noted that while only one dimension (product) is being presented on the UIs as an example herein, more than one dimension (e.g., product and region) may be presented. There is a one-to-one mapping between the dimension and the group. For example, group 1 is mapped to beverages, which is mapped to a dimension called "product", and as another non-exhaustive example, there may be another dimension called "region", and in "region" there is a comment on two nodes (e.g., New York and New Jersey). New York and New Jersey is group 2, which will be mapped to the dimension called "region". The comment context may include more than one dimension, and each group within that dimension is mapped to only that dimension.

Figure 10:
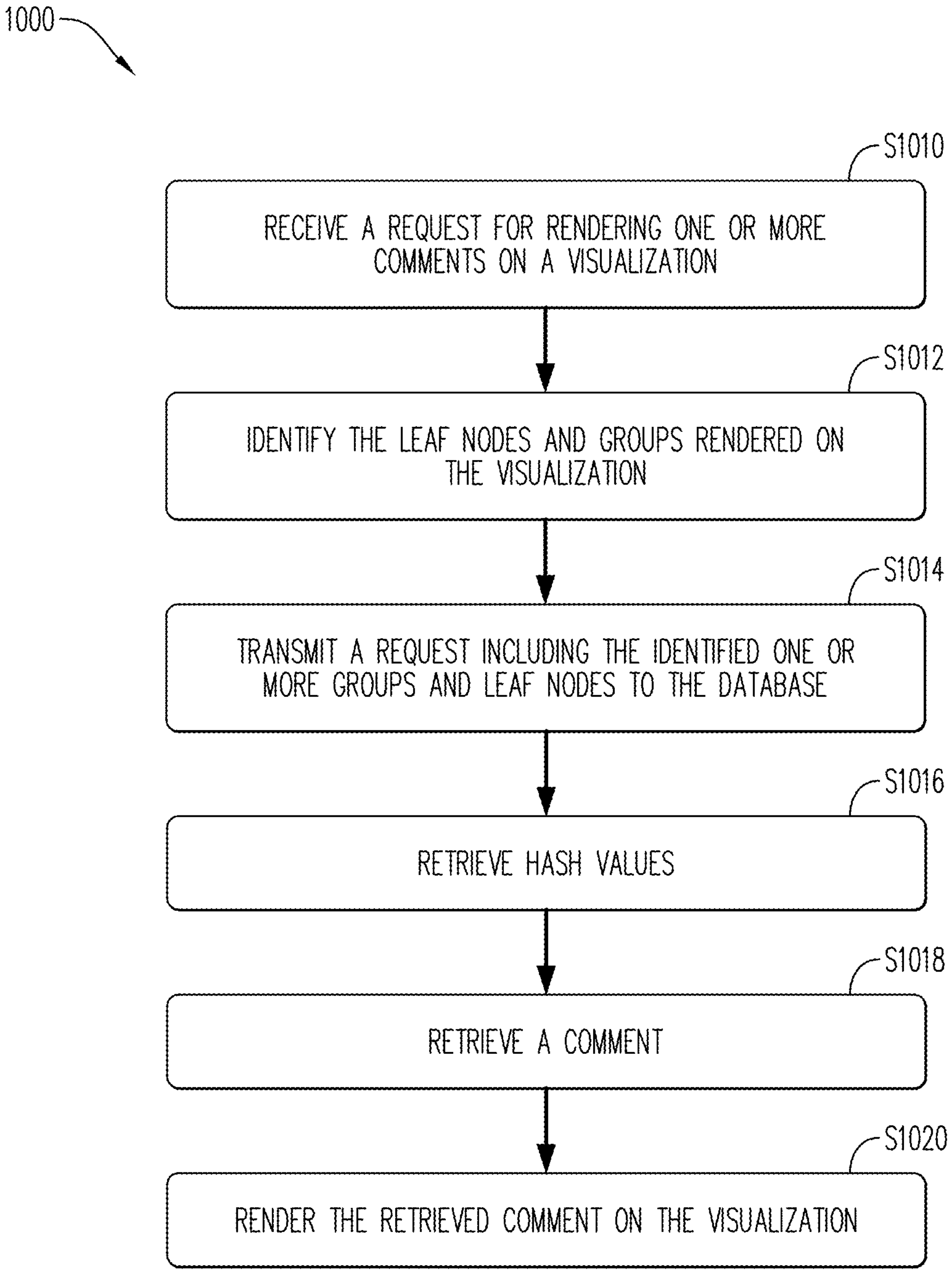
FIG. 10 is a flow diagram of a process according to some embodiments.

FIG. 10 illustrates a process 1000 to render a stored comment on a new visualization according to some embodiments.

Figure 11:
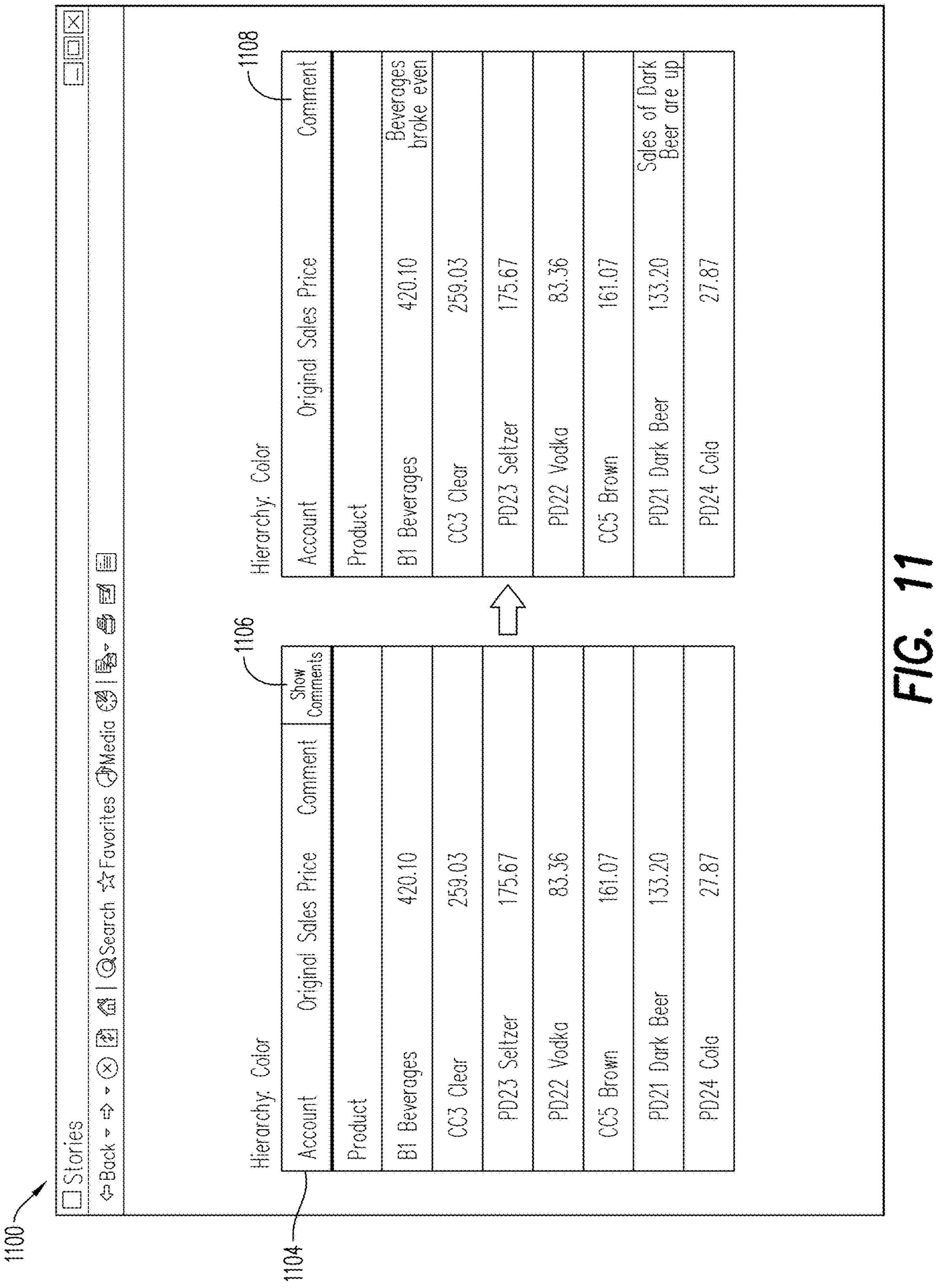
FIG. 11 is a user interface according to some embodiments.

Prior to the process 1000, the user has created a table (e.g., 802), added a comment to at least one cell in the table 802, saved the comments (in this case two comments), created a new table 1104 (FIG. 11) and saved the new table, as shown in the user interface 1100 of FIG. 11. For ease of explanation, the new table/new visualization will be referred to as the second table/second visualization.

Initially, at S1010, a request is received for rendering one or more stored comments on a data point of the second visualization. The request may include the leaf nodes included in the second visualization. The request may be received via selection of a "Show Comments" user interface element 1106, or via any other suitable process. In response to the selection, at S1012, the leaf nodes and groups rendered on the second visualization are identified. In a case this second visualization was previously saved, the groups and hash values for the respective groups and individual leaf nodes were previously generated for this second visualization upon saving of the second table. In a case this second visualization was not previously saved, the groups and hash values for respective groups and individual leaf nodes may be generated as described above with respect to FIG. 4, using the leaf nodes in the request, in response to the selection of the "Show Comments" UI element 1106. Here, the rendered groups are the Beverages Group including leaves Seltzer, Vodka, Dark Beer and Cola, the Clear Group including leaves Seltzer and Vodka, and the Brown Group including leaves Dark Beer and Cola.

Then, in S1014, a request including the identified one or more groups in the second visualization are transmitted to the database 312. In response, the hash value for each identified one or more groups in the second visualization are received. The hash values for each of the identified one or more groups in the second visualization are referred to as "second visualization hash values."

Next, in S1016, the hash values are retrieved ("fetched") for each group stored in the database associated with the data model structure for a visualization different from the second visualization (e.g., the first table/visualization or any other previously stored table/visualization). The hash values for each group stored in the database associated with the data model structure for the visualization different from the second visualization are referred to as "other visualization hash values." The hash values are retrieved based on each group being matched against any saved hash values of other visualizations. In a case a match exists, the comment qualifies to be rendered. It is noted, and as described above, while the figures described herein include only one dimension "product", in other examples more than one dimension may be used. In the case of other dimensions being used, the other dimension's group hashes also need to match for retrieval of the hash values. For example, if the comment was saved with a visualization that had both product dimension and region dimension, the hash values will be retrieved in a case a match exists for groups in both the product dimension and region dimension in the present visualization.

A comment including the other visualization hash values is retrieved at S1018 in a case there is a match between the second visualization hash values and the other visualization hash values.

The retrieved comment is then rendered on the second visualization at S1020.

Continuing with the non-exhaustive example, the second hash value 610 of Hash Value 1 for the Beverages group for the second table 1104 is the same (matches) as the hash value 510 of Hash Value 1 for the Beverages group other (first) table 802 of FIG. 8 Regarding the comment stored on the leaf node Dark Beer, the hash value 610 of Hash Value 6 for the second table 1104 is the same (matches) as the hash value 510 of Hash Value 6 for the Dark Beer node in the other (first) table 802. Because the hash values match, the stored comments are retrieved and rendered on the table 1108.

The inventor notes that an advantage of creating the groups and then hash values for the groups and individual leaf nodes is that to determine whether a stored comment should be displayed on a new visualization, the system, in response to a request for rendering stored comments, generates a database query of SELECT * from Source Table WHERE Hash Values equal Hash Values in Target Table, and this returns the hash values that are the same in the source and target tables. The Source Table including the hash values for visualizations different from the new visualization, and the Target Table including the hash values for the new visualization. The system may then identify the stored comments associated with the hash values in the source tables that are the same as the target tables and render them on the new visualization. The use of the grouping and hash values avoids all of the comments for the model being fetched, avoids all of the combinations that exist in the database for mode being fetched, and avoids matching the existing combinations against the nodes in the new visualization.

The inventor notes an advantage of determining whether stored comments should be rendered using the process described herein by embodiments is that there is no additional processing to make the determination beyond matching the hash values for the stored comments to the hash values for the groups in the new visualization.

Figure 12:
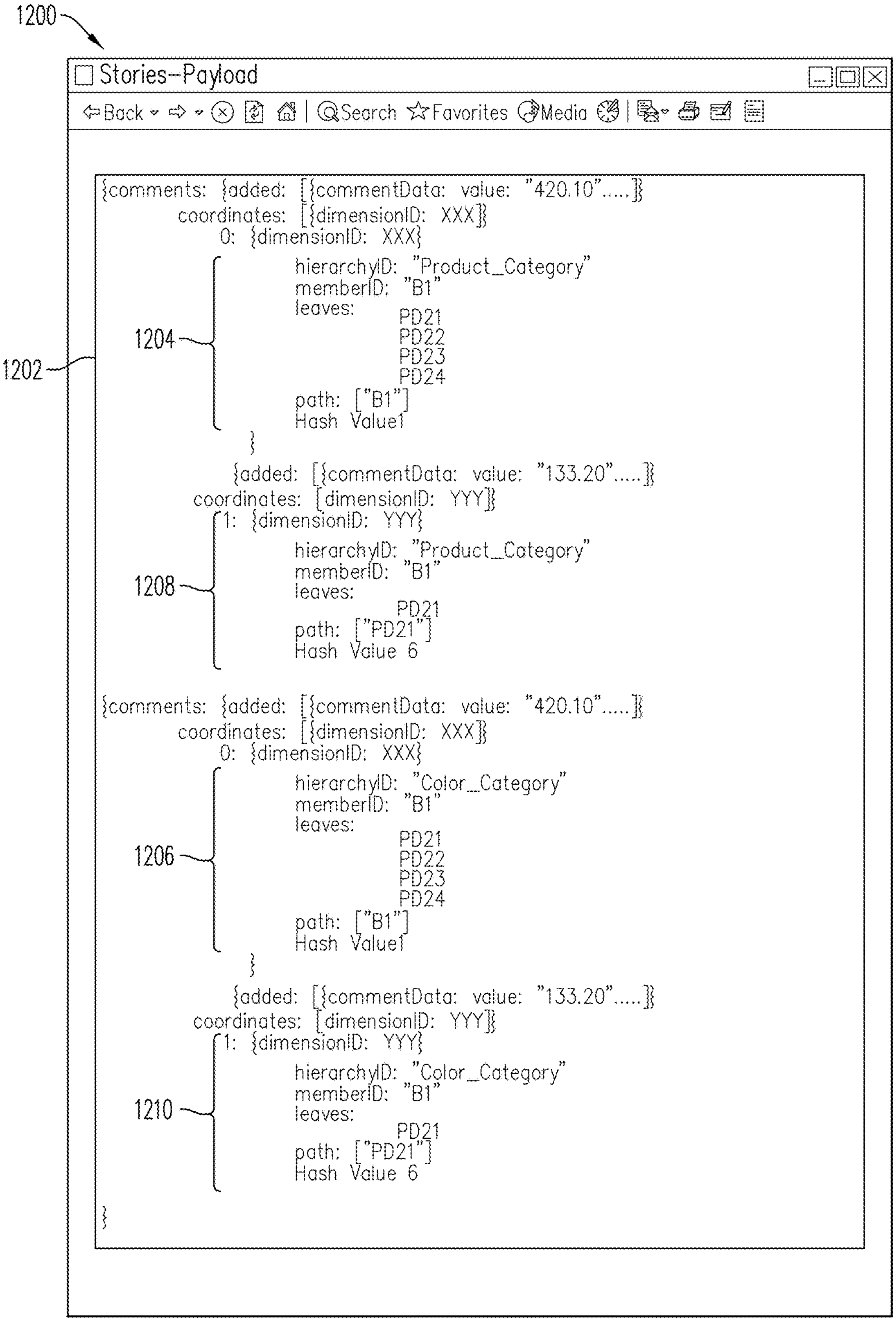
FIG. 12 is a user interface including a partial payload for FIG. 11 according to some embodiments.

FIG. 12 displays a user interface 1200 including a comment payload 1202 for the comments rendered in FIG. 11. As can be seen in the comment payload 1202, the comments are stored against all of the groups that have a matching hash value. In particular, the first comment—Beverages Broke Even—is stored for the group in first table at 1204, and stored for the group in the second table at 1206. Similarly, the second comment—Sales of Dark Beer are Up—is stored for the leaf nodes in the first table at 1208, and stored for the leaf node in the second table at 1210.

Figure 13:
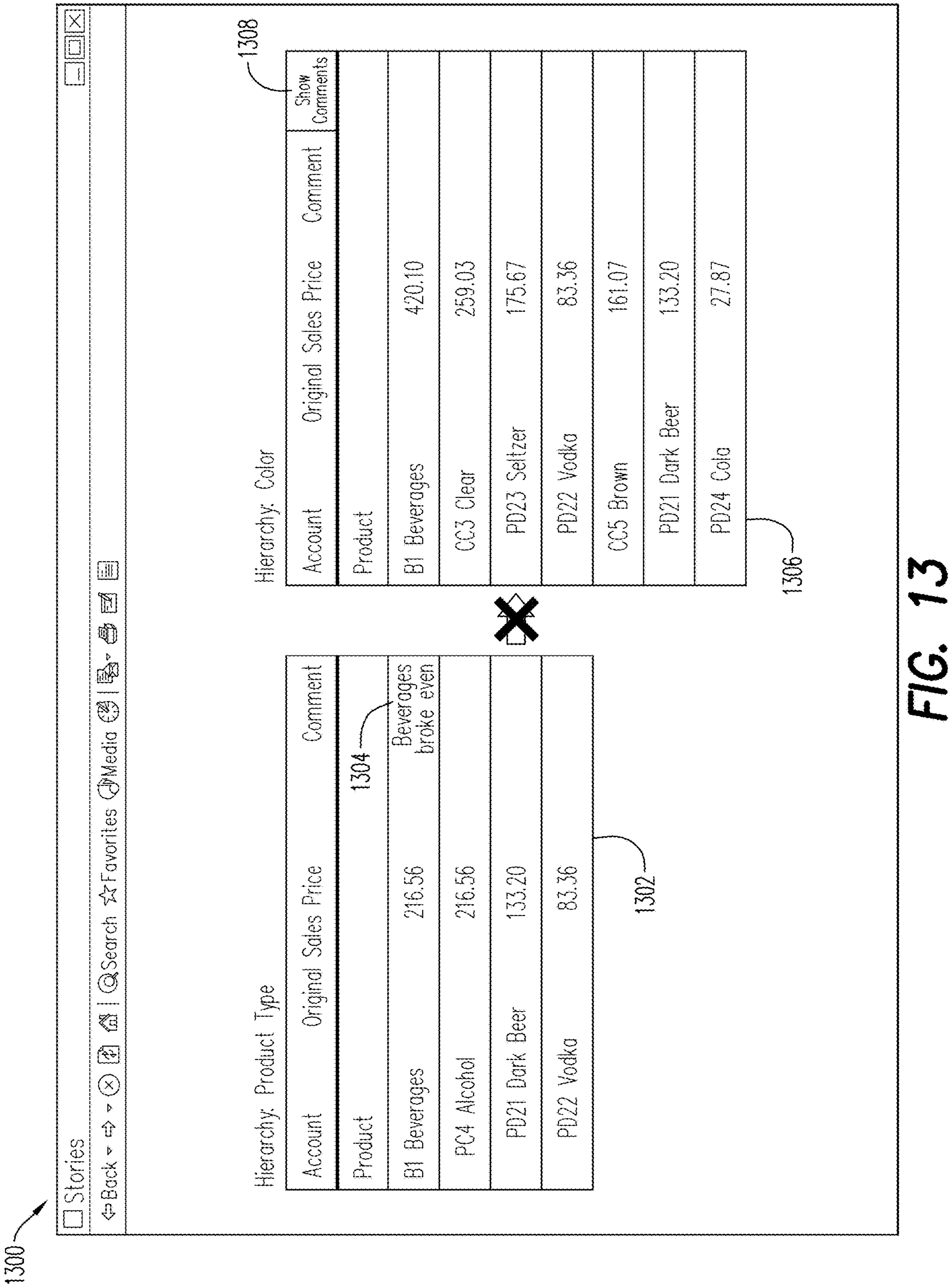
FIG. 13 is a user interface according to some embodiments.

FIG. 13 displays a user interface 1300 including another non-exhaustive example. Here, a filter has been applied to the table 802 in FIG. 8, to only select Alcohol and generate the table 1302. The groups were generated and hash values saved for the groups as described above with respect to FIG. 4. Further, a comment 1304—Beverages broke even—was added to the Beverages cell, and saved, as described above. A second table 1306 was generated for the Color Hierarchy, as described above with respect to table 804 in FIG. 8. Here, in a case the "Show Comments" element 1308 is selected, the comment 1304—Beverages broke even—included in the first table 1302 will not be included in the second table 1306 because the groups in the filtered table have changed—compared to table 802 in FIG. 8. For example, the Beverages Group for table 1302 includes only Dark Beer and Vodka, while the Beverages Group for table 802 includes Dark Beer, Vodka, Seltzer and Cola. The changed groups result in different hash values being generated and saved. The changed hash values no longer have a match with the hash values generated for the groups in the second table 1306.

Figure 14:
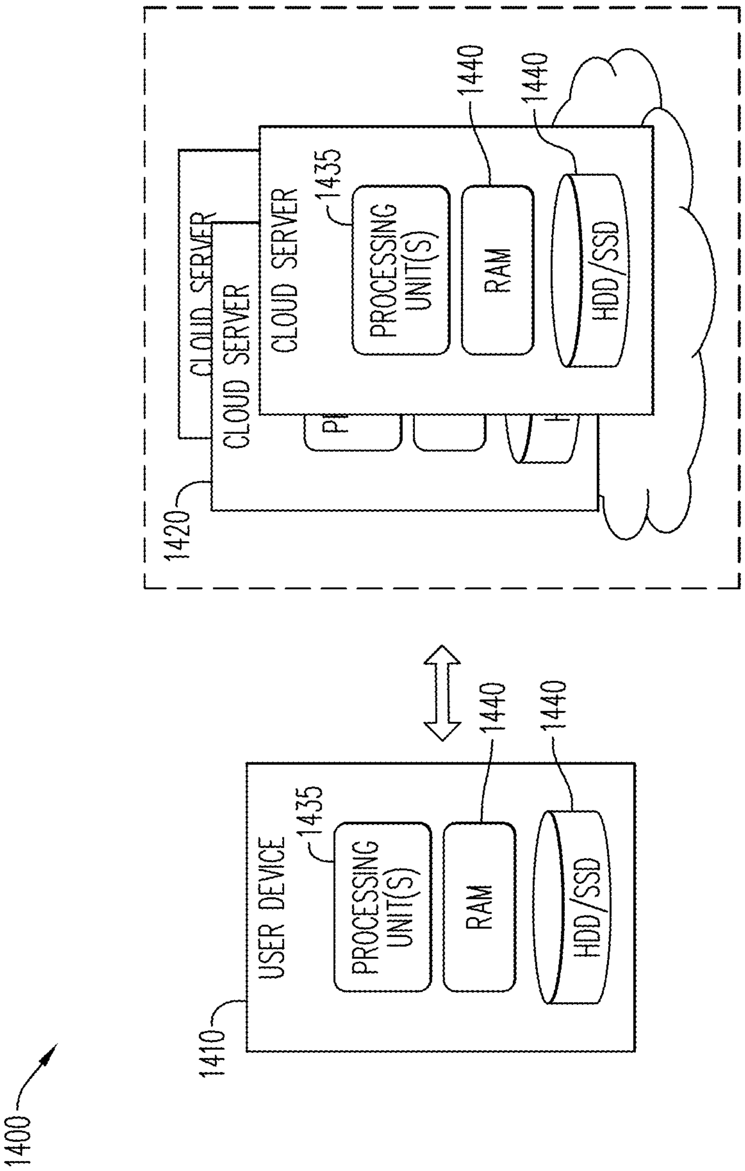
FIG. 14 is a block diagram of a cloud-based architecture according to some embodiments.

FIG. 14 illustrates a cloud-based database deployment 1400 according to some embodiments. The illustrated components may reside in one or more public clouds providing self-service and immediate provisioning, autoscaling, security, compliance and identity management features.

User device 1410 may interact with applications executing on the cloud server 1420, for example via a Web Browser executing on user device 1410, in order to generate a code replacement. Cloud server 1420 may comprise cloud-based compute resources, such as virtual machines, allocated by a public cloud provider. As such, cloud server 1420 may be subjected to demand-based resource elasticity. Each of the user device 1410, and cloud server 1420 may include a processing unit 1435 that may include one or more processing devices each including one or more processing cores. In some examples, the processing unit 1435 is a multicore processor or a plurality of multicore processors. Also, the processing unit 1435 may be fixed or it may be reconfigurable. The processing unit 1435 may control the components of any of the user device 1410 and cloud server 1420. The storage devices 1440 may not be limited to a particular storage device and may include any known memory device such as RAM, ROM, hard disk, and the like, and may or may not be included within a database system, a cloud environment, a web server or the like. The storage device 1440 may store software modules or other instructions/executable code which can be executed by the processing unit 1435 to perform the method shown in FIGS. 4, 7 and 10. According to various embodiments, the storage device 1440 may include a data store having a plurality of tables, records, partitions and sub-partitions. The storage device 1440 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:

a memory storing program code; and one or more processing units to execute the program code to cause the system to:

receive a plurality of leaf nodes;

generate one hierarchical path for each leaf node;

generate one or more groups for the plurality of leaf nodes based on the generated hierarchical path;

generate a hash value for each group and each individual leaf node;

store each hash value in a database;

receive a comment for a first node in a first cell of a plurality of cells in a visualization, wherein the first cell corresponds to a first node and the first node is one of: a parent node, one of a plurality of sub-parent nodes or the leaf node;

store the comment;

map the hash values associated with the first node to the comment by adding the hash values associated with the first node to a comment payload;

store the hash value with the comment in the comment payload;

receive a request for rendering one or more stored comments on a second visualization;

identify one or more groups of two or more leaf nodes in the second visualization;

transmit a request including the identified one or more groups in the second visualization to the database;

receive the hash value for each of the identified one or more groups in the second visualization, wherein the hash value for each of the identified one or more groups in the second visualization are second visualization hash values;

retrieve the hash value for each group stored in the database associated with the data model structure for a visualization different from the second visualization, wherein the hash value for each group stored in the database associated with the data model structure for the visualization different from the second visualization are other visualization hash values;

identify any matches between the second visualization hash values and the other visualization hash values;

retrieve a comment including the other visualization hash value in the comment payload in a case there is a match between the second visualization hash value and the other visualization hash value; and render the retrieved comment on the second visualization.

2. The system of claim 1, wherein each leaf node represents a member of a dimension and each dimension includes one or more attributes.

3. The system of claim 2, wherein the hierarchical path represents a plurality of nodes in a parent-child hierarchy including at least one leaf node and at least one parent node or sub-parent node.

4. The system of claim 3, wherein the hierarchical path is based on a data model structure.

5. The system of claim 4, wherein generating each hierarchical path further comprises program code to cause the system to:

identify a plurality of leaf nodes in a visualization;

identifies the parent node for each leaf node in the data model structure;

analyzes each level between the parent node and the leaf node in the data model associated with a respective leaf node to identify any sub-parent nodes in the data model structure for the respective leaf node; and add any identified sub-parent nodes to the identified parent node and the identified leaf node to generate the path, wherein the nodes in the path are listed in hierarchical order from parent node to leaf node.

6. The system of claim 5, wherein generating one or more groups further comprises program code to cause the system to:

identify, for the generated paths, leaf nodes having common parents and sub-parents in the hierarchy;

generate a first group of two or more leaf nodes, wherein a respective path of the two or more leaf nodes in the first group include all common parents and sub-parents.

7. The system of claim 1, wherein mapping the hash value further comprises program code to cause the system to:

identify a group of two or more leaf nodes including the first node;

retrieve the hash value generated for the identified group; and store the retrieved hash value in the comment payload.

8. A computer-implemented method comprising:

receiving a plurality of leaf nodes;

generating one hierarchical path for each leaf node, wherein the hierarchical path is based on a data model structure;

generating one or more groups for the plurality of leaf nodes based on the generated hierarchical path;

generating a hash value for each group and each individual leaf node;

storing each hash value in a database;

receiving a comment for a first node in a first cell of a plurality of cells in a visualization, wherein the first cell corresponds to the first node and the first node is one of: a parent node, one of a plurality of sub-parent nodes or the leaf node;

storing the comment;

mapping the hash values associated with the first node to the comment by adding the hash values associated with the first node to a comment payload;

storing the hash value with the comment in the comment payload;

receiving a request for rendering one or more stored comments on a second visualization;

identifying one or more groups of two or more leaf nodes in the second visualization;

transmitting a request including the identified one or more groups in the second visualization to the database;

receiving the hash value for each of the identified one or more groups in the second visualization, wherein the hash value for each of the identified one or more groups in the second visualization are second visualization hash values;

retrieving the hash value for each group stored in the database associated with the data model structure for a visualization different from the second visualization, wherein the hash value for each group stored in the database associated with the data model structure for the visualization different from the second visualization are other visualization hash values;

identifying any matches between the second visualization hash values and the other visualization hash values;

retrieving a comment including the other visualization hash value in the comment payload in a case there is a match between the second visualization hash value and the other visualization hash value; and rendering the retrieved comment on the second visualization.

9. The method of claim 8, wherein the hierarchical path represents a plurality of nodes in a parent-child hierarchy including at least one leaf node and at least one parent node or sub-parent node.

10. The method of claim 9, wherein generating each hierarchical path further comprises:

identifying a plurality of leaf nodes in a visualization;

identifying the parent node for each leaf node in the data model structure;

analyzing each level between the parent node and the leaf node in the data model associated with a respective leaf node to identify any sub-parent nodes in the data model structure for the respective leaf node; and adding any identified sub-parent nodes to the identified parent node and the identified leaf node to generate the path, wherein the nodes in the path are listed in hierarchical order from parent node to leaf node.

11. The method of claim 10, wherein generating the one or more groups further comprises:

identifying, for the generated paths, leaf nodes having common parents and sub-parents in the hierarchy;

generating a first group of two or more leaf nodes, wherein a respective path of the two or more leaf nodes in the first group include all common parents and sub-parents.

12. The method of claim 8, wherein mapping the hash values further comprises:

identifying the group of two or more leaf nodes including the first node;

retrieving the hash value generated for the identified group; and storing the retrieved hash value in the comment payload.

13. One or more non-transitory, computer-readable medium storing instructions, that, when executed by a computing system, cause the computing system to perform operations comprising:

receiving a plurality of leaf nodes included in a visualization;

generating one hierarchical path for each leaf node, wherein the hierarchical path is based on a data model structure;

generating one or more groups for the plurality of leaf nodes based on the generated hierarchical path;

generating a hash value for each group and each individual leaf node;

storing each hash value in a database receiving a comment for a first node in a first cell of a plurality of cells in a visualization, wherein the first cell corresponds to the first node and the first node is one of: a parent node, one of a plurality of sub-parent nodes or the leaf node;

storing the comment;

mapping the hash values associated with the first node to the comment by adding the hash values associated with the first node to a comment payload;

storing the hash value with the comment in the comment payload;

receiving a request for rendering one or more stored comments on a second visualization;

identifying one or more groups of two or more leaf nodes in the second visualization;

transmitting a request including the identified one or more groups in the second visualization to the database;

receiving the hash value for each of the identified one or more groups in the second visualization, wherein the hash value for each of the identified one or more groups in the second visualization are second visualization hash values;

retrieving the hash value for each group stored in the database associated with the data model structure for a visualization different from the second visualization, wherein the hash value for each group stored in the database associated with the data model structure for the visualization different from the second visualization are other visualization hash values;

identifying any matches between the second visualization hash values and the other visualization hash values;

retrieving a comment including the other visualization hash value in the comment payload in a case there is a match between the second visualization hash value and the other visualization hash value; and rendering the retrieved comment on the second visualization.

* * * * *